United States Patent [19]

Nakano et al.

[11] Patent Number: 5,206,196

[45] Date of Patent: Apr. 27, 1993

[54] CATALYST FOR PURIFYING EXHAUST GAS

[75] Inventors: Masao Nakano, Hikari; Akinori Eshita; Kazuhiko Sekizawa, both of Shinnanyo, all of Japan

[73] Assignee: Tosoh Corporation, Shinnanyo, Japan

[21] Appl. No.: 805,611

[22] Filed: Dec. 12, 1991

[30] Foreign Application Priority Data

Dec. 18, 1990 [JP] Japan ................. 2-411258
Dec. 18, 1990 [JP] Japan ................. 2-411259
Dec. 18, 1990 [JP] Japan ................. 2-411260
Dec. 18, 1990 [JP] Japan ................. 2-411261

[51] Int. Cl.$^5$ ............................. B01J 29/10
[52] U.S. Cl. ........................... 502/73; 502/65
[58] Field of Search ............ 502/65, 73, 71, 77; 423/239

[56] References Cited

FOREIGN PATENT DOCUMENTS

| 45054 | 2/1982 | European Pat. Off. | ............ 502/71 |
|---|---|---|---|
| 0362966 | 4/1990 | European Pat. Off. | . |
| 0415410 | 3/1991 | European Pat. Off. | . |
| 0434063 | 6/1991 | European Pat. Off. | . |
| 50-55575 | 5/1975 | Japan | ................. 423/239 |
| 52-30771 | 3/1977 | Japan | ................. 423/239 |
| 2201647 | 9/1987 | Japan | ................. 423/239 |
| 63-283727 | 11/1988 | Japan | . |
| 1-130735 | 5/1989 | Japan | . |
| 2-251247 | 10/1990 | Japan | ................. 502/77 |

*Primary Examiner*—Carl F. Dees
*Attorney, Agent, or Firm*—Oblon, Spivak, McClelland, Maier & Neustadt

[57] ABSTRACT

A catalyst for purifying an exhaust gas to remove nitrogen oxides, carbon monoxide and hydrocarbons from an oxygen-rich exhaust gas containing nitrogen oxides, carbon monoxide and hydrocarbons comprising (i) a zeolite having an $SiO_2/Al_2O_3$ mole ratio of at least 15 and (ii) (a) cobalt, (b) a rare earth metal and (c) silver, or nickel and/or zinc, or platinum and/or manganese, or copper and/or rhodium, incorporated thereinto.

16 Claims, No Drawings

CATALYST FOR PURIFYING EXHAUST GAS

BACKGROUND OF THE INVENTION

1. Field of the Invention

The present invention relates to a catalyst for purifying an exhaust gas to remove nitrogen oxides, carboxy monoxide and hydrocarbons contained in an exhaust gas discharged, for example, from internal combustion engines of automobiles. More specifically, it relates to a catalyst for removing nitrogen oxides contained in an oxygen-rich exhaust gas.

The term "oxygen-rich exhaust gas" used in the present invention is intended to mean an exhaust gas containing oxygen in an amount exceeding the amount of oxygen necessary for completely oxidizing carbon monoxide and hydrocarbons contained in the exhaust gas.

2. Description of the Related Art

Nitrogen oxides, carbon monoxide and hydrocarbons, which are toxic substances contained in an exhaust gas discharged from internal combustion engines, are removed, for example, through the use of a three-way catalyst comprising Pt, Rh, Pd, etc., supported on a carrier material. In the case of an exhaust gas discharged from diesel engines, however, no effective catalyst exists for removing nitrogen oxides because the exhaust gas contains a large amount of oxygen, and thus a purification of the exhaust gas by a catalyst has not been realized.

In recent gasoline engines, a lean burn combustion is used for lowering the fuel consumption and reducing the amount of exhausted carbon dioxide gas, but an exhaust gas from this lean burn gasoline engine comprises an atmosphere containing an excessive amount of oxygen, and therefore, it is impossible to apply the above-mentioned conventional three-way catalyst, and thus a method of removing toxic components from the exhaust gas has not been put to practical use.

Examples of the method of removing particularly nitrogen oxides in an exhaust gas containing an excessive amount of oxygen include that wherein a reducing agent, such as ammonia, is added, and that wherein the nitrogen oxides are absorbed in an alkali, to remove same. These methods are not effective for automobiles, which are a moving nitrogen oxides source, and thus the application thereof is limited.

Recently it has been reported that a zeolite catalyst subjected to an ion exchange with a transition metal can remove nitrogen oxides in an exhaust gas containing an excessive amount of oxygen without the addition of a special reducing agent such as ammonia. For example, Japanese Unexamined Patent Publication (Kokai) Nos. 63-283727 and 1-130735 propose a catalyst which can selectively reduce nitrogen oxides even in an exhaust gas containing an excessive amount of oxygen and can remove minor amounts of reducing agents such as unburnt carbon monoxide and hydrocarbons.

The activity of the above-mentioned catalysts proposed in the art, however, is remarkably deteriorated when the catalyst is used at a high temperature for a long time, and thus it is necessary to improve the durability and catalytic performance thereof.

Accordingly, to solve the above-described problems, a catalyst for purifying an exhaust gas comprising a zeolite having an $SiO_2/Al_2O_3$ mole ratio of at least 15, and incorporated therein, cobalt and a rare earth metal has been proposed (see Japanese Patent Application No. 2-149203).

Although the exhaust gas purification catalyst proposed in Japanese Patent Application No. 2-149203 has an improved durability, the temperature region in which the nitrogen oxides can be removed is relatively narrow. Therefore, a higher capability of removing nitrogen oxides in a broader temperature region, particularly at a low temperature, is required from a catalyst for purifying an exhaust gas discharged, in particular, from automobiles.

SUMMARY OF THE INVENTION

Accordingly, the objects of the present invention are to eliminate the above-mentioned disadvantages of the prior art and to provide a catalyst for purifying an exhaust gas catalyst which is capable of simultaneously removing nitrogen oxides, carbon monoxide and hydrocarbons from an exhaust gas discharged from, for example, internal combustion engines of automobiles, and is less susceptible to thermal deterioration and has a high catalytic activity.

Other objects and advantages of the present invention will be apparent from the following description.

The present inventors have made extensive and intensive studies into the above-mentioned problems, and as a result, found that the incorporation of any one of (1) silver,
(2) nickel and/or zinc,
(3) platinum and/or manganese, and
(4) copper and/or rhodium, in the above-mentioned catalyst for purifying an exhaust gas comprising a zeolite having an $SiO_2/Al_2O_3$ mole ratio of at least 15, and incorporating therein cobalt and a rare earth metal, improves the capability thereof of removing nitrogen oxides, and thus completed the present invention.

Accordingly, the present invention provides a catalyst for purifying an exhaust gas to remove nitrogen oxides, carbon monoxide and hydrocarbons from an oxygen-rich exhaust gas containing nitrogen oxides, carbon monoxide and hydrocarbons comprising a zeolite having an $SiO_2/Al_2O_3$ mole ratio of at least 15, and incorporated thereinto, cobalt and a rare earth metal and any one of (1) silver,
(2) nickel and/or zinc,
(3) platinum and/or manganese, and
(4) copper and/or rhodium.

The present invention also provides a method of removing nitrogen oxides, carbon monoxide and hydrocarbons contained in an exhaust gas by bringing the catalyst for purifying an exhaust gas into contact with a combustion waste gas containing nitrogen oxides, carbon monoxide and hydrocarbons.

DESCRIPTION OF THE PREFERRED EMBODIMENTS

The present invention will now be described in more detail.

The catalyst for purifying an exhaust gas according to the present invention comprises a zeolite having an $SiO_2/Al_2O_3$ mole ratio of at least 15, and incorporated thereinto, the above-described metals.

The above-mentioned zeolite generally has the following composition:

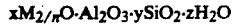

wherein n is a valency of the cation, x is 0.8 to 1.2, y is at least 2, and z is at least 0 (zero). In the zeolite used in the present invention, the $SiO_2/Al_2O_3$ mole ratio is preferably at least 15. There is no particular limitation of the upper limit of the $SiO_2/Al_2O_3$ mole ratio, but when the $SiO_2/Al_2O_3$ mole ratio is less than 15, the heat resistance and durability of the zeolite per se are low, and thus the heat resistance and durability of the catalyst are unsatisfactory. The $SiO_2/Al_2O_3$ mole ratio is more preferably about 15 to 1000.

The zeolite constituting the catalyst of the present invention may be a naturally occurring zeolite or a synthetic zeolite. There is no particular limitation of the method of producing the zeolite. Representative examples of the zeolite used in the present invention include ferrierite, Y, ZSM-5, ZSM-11, ZSM-12 and ZSM-20. These zeolites per se may be used as the catalyst of the present invention, or used after treatment with an ammonium salt, a mineral acid or the like for an ion exchange to form an $NH_4$ or H type zeolite.

The zeolite used in the present invention contains (a) cobalt, (b) rare earth metal and (c) any one of (1) silver,
(2) nickel and/or zinc,
(3) platinum and/or manganese, and
(4) copper and/or rhodium.

There is no particular limitation of the method of incorporating the above-mentioned metals into the zeolite, and in general, the above-mentioned metals can be incorporated by an ion exchange method, an impregnation method, and an evaporation-to-dryness method through the use of a water soluble salt. The above-mentioned metals may be incorporated at one time, or may be successively incorporated.

When incorporating the above-mentioned metals in the zeolite, the concentration of individual metal ions in the aqueous solution can be properly selected depending upon the intended percentage ion exchange of the catalyst. Examples of the rare earth metal ions include La, Ce, Pr, Nd and Y. The above-mentioned metal ions may be used in a soluble salt, and suitable examples of the soluble salt include nitrate, acetate, oxalate and chloride.

Regarding the contents of the individual metals in terms of mole ratio to the alumina in the zeolite, the contents of cobalt and rare earth metal are preferably 0.1 to 1.5 times more preferably 0.2 to 1.4 times and 0.1 to 1 time, more preferably 0.2 to 1.0 time, respectively. Further, preferably;

1) the content of silver is 0.05 to 2 times, more preferably 0.1 to 1.8 times and the total content of cobalt, rare earth metal and silver is 1.0 to 2.5 times, more preferably 1.0 to 2.3 times, 2) the content of nickel or zinc is 0.05 to 2 times, more preferably 0.1 to 1.8 times, and the total content of cobalt and rare earth metal and nickel and/or zinc is 1.0 to 2.5 times, more preferably 1.0 to 2.3 times, 3) the content of platinum or manganese is 0.05 to 1.5 times, more preferably 0.1 to 1.4 times, and the total content of cobalt and rare earth metal and platinum and/or manganese is 1.0 to 2.5 times, more preferably 1.0 to 2.3 times, and 4) the content of copper or rhodium is 0.05 to 1.5 times, more preferably 0.1 to 1.4 times, and the total content of cobalt and rare earth metal and copper and/or rhodium is 1.0 to 2.5 times, more preferably 1.0 to 2.3 times.

The sample containing the above-described metals is generally used after solid-liquid separation, washing and drying, and if necessary, can be used after calcination.

The catalyst for purifying an exhaust gas according to the present invention may be used after mixing with a binder, such as a clay mineral, and then molding. Alternatively, the zeolite may be previously molded, and the above-mentioned metals may be incorporated into the molding. Examples of the binder used in molding of the zeolite include clay minerals such as kaolin, attapulgite, montmorillonite, bentonite, allophane and sepiolite, silica and alumina. Alternatively, the catalyst may be a binder-less zeolite molding directly synthesized without the use of a binder. Further, the zeolite may be washcoated onto a honeycomb-structured base material made of cordierite, a metal or the like.

The nitrogen oxides, carbon monoxide and hydrocarbons contained in an oxygen-rich exhaust gas can be removed by bringing the exhaust gas into contact with the exhaust gas purification catalyst according to the present invention.

Specific examples of such an exhaust gas include exhaust gases discharged, for example, from the internal combustion engines of automobiles, particularly exhaust gases produced at a high air/fuel ratio (i.e., in the lean burn region).

There is no particular limitation in the operating conditions of the catalyst according to the present invention, but the preferable temperature is 100° C. to 900° C., more preferably 150° C. to 800° C. and the preferable space velocity is 1,000 to 500,000 hr$^{-1}$. The "space velocity" means a value of a gas flow rate (cc/hr) divided by a catalyst volume (cc).

The above-mentioned catalyst for purifying an exhaust gas exhibits no change in the performance thereof even when applied to an exhaust gas containing carbon monoxide, hydrocarbons and hydrogen but not containing an excessive amount of oxygen.

EXAMPLES

The present invention will now be further illustrated by, but is by no means limited to, the following Examples.

COMPARATIVE EXAMPLE 1: PREPARATION OF COMPARATIVE CATALYST 1

A ZSM-5-like zeolite was synthesized according to the method described in Example 5 of Japanese Unexamined Patent Publication (Kokai) No. 59-54620. The zeolite had the following composition in terms of mole ratios of oxides on an anhydrous basis:

1.1 $Na_2O \cdot Al_2O_3$ ·40 $SiO_2$.

The zeolite was ion-exchanged with an aqueous ammonium chloride solution, 200 g of the resultant ammonium type ZSM-5 was put in 1800 ml of a 1.09 mol/liter aqueous lanthanum chloride solution, and the mixture was stirred at 80° C. for 16 hr. The stirred mixture was subjected to solid-liquid separation, washed with water, subsequently put in 1800 ml of a 0.23 mol/liter aqueous cobalt (II) acetate tetrahydrate solution, and the mixture was stirred at 80° C. for 16 hr. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 10 hr, to prepare a comparative catalyst 1. The catalyst was subjected to a chemical analysis to determine the lanthanum and cobalt contents, and as a result, it was found that the lanthanum and cobalt contents were respectively 0.33 time, 1.13 times as divalent cobalt, based on the number of moles of $Al_2O_3$ in the zeolite.

EXAMPLE 1: PREPARATION OF CATALYST 1

A 15 g amount of comparative catalyst 1 prepared in Comparative Example 1 was put in 22 ml of a 0.025 mol/liter aqueous silver nitrate solution, dried under reduced pressure while stirring, and further dried at 110° C. for 16 hr, to thereby prepare a catalyst 1. The catalyst was subjected to a chemical analysis to determined the contents of lanthanum, cobalt and silver, and as a result, it was found that lanthanum, cobalt and silver were contained in respective amounts of 0.33 time, 1.13 times as divalent cobalt and 0.1 time, based on the number of moles of $Al_2O_3$ in the zeolite.

EXAMPLE 2: PREPARATION OF CATALYST 2

A 15 g amount of comparative catalyst 1 prepared in Comparative Example 1 was put in 43 ml of a 0.05 mol/liter aqueous silver nitrate solution, dried under reduced pressure while stirring, and further dried at 110° C. for 16 hr, to thereby prepare a catalyst 2. The catalyst was subjected to a chemical analysis to determine the contents of lanthanum, cobalt and silver, and as a result, it was found that lanthanum, cobalt and silver were contained in respective amounts of 0.33 time, 1.13 times as divalent cobalt and 0.4 time, based on the number of moles of $Al_2O_3$ in the zeolite.

EXAMPLE 3: PREPARATION OF CATALYST 3

A 15 g amount of comparative catalyst 1 prepared in Comparative Example 1 was put in 43 ml of a 0.05 mol/liter aqueous silver nitrate solution, and the mixture was stirred at 80° C. for 16 hr. The stirred mixture was subjected to solid-liquid separation, washed with water, and dried at 110° C. for 16 hr, to thereby prepare a catalyst 3. The catalyst was subjected to a chemical analysis to determine the contents of lanthanum, cobalt and silver, and as a result, it was found that lanthanum, cobalt and silver were contained in respective amounts of 0.31 time, 1.05 times as divalent cobalt and 0.15 time, based on the number of moles of $Al_2O_3$ in the zeolite.

EXAMPLE 4: PREPARATION OF CATALYST 4

A 20 g amount of ammonium type ZSM-5 prepared in Comparative Example 1 was put in 180 ml of a 1.09 mol/liter aqueous lanthanum chloride solution, and the mixture was stirred at 80° C. for 16 hr. The stirred mixture was subjected to solid-liquid separation, washed with water, subsequently put in 180 ml of a 0.23 mol/liter aqueous cobalt (II) nitrate tetrahydrate solution, and the mixture was stirred at 80° C. for 16 hr. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 10 hr, and the procedure of Example 2 was repeated to prepare a catalyst 4. The catalyst was subjected to a chemical analysis to determine the contents of lanthanum, cobalt and silver, and as a result, it was found that lanthanum, cobalt and silver were contained respectively in amounts of 0.32 time, 0.42 time as divalent cobalt and 0.4 time, based on the number of moles of $Al_2O_3$ in the zeolite.

COMPARATIVE EXAMPLE 2: PREPARATION OF COMPARATIVE CATALYST 2

A 200 g amount of ammonium type ZSM-5 prepared in Comparative Example 1 was put in 1800 ml of a 1.09 mol/liter aqueous cerium chloride solution, and the mixture was stirred at 80° C. for 16 hr. The stirred mixture was subjected to solid-liquid separation, washed with water, subsequently put in 1800 ml of a 0.23 mol/liter aqueous cobalt (II) acetate tetrahydrate solution, and the mixture was stirred at 80° C. for 16 hr. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 10 hr, to thereby prepare a comparative catalyst 2. The comparative catalyst was subjected to chemical analysis to determine the contents of cerium and cobalt, and as a result, it was found that cerium and cobalt were contained respectively in amounts of 0.13 time and 1.12 times, as divalent cobalt, based on the number of moles of $Al_2O_3$ in the zeolite.

EXAMPLE 5: PREPARATION OF CATALYST 5

A 15 g amount of comparative catalyst 2 prepared in Comparative Example 2 was put in 43 ml of a 0.05 mol/liter aqueous silver nitrate solution, dried under reduced pressure while stirring, and further dried at 110° C. for 16 hr, to thereby prepare a catalyst 5. The catalyst was subjected to a chemical analysis to determine the contents of cerium, cobalt and silver, and as a result, it was found that cerium, cobalt and silver were contained in respective amounts of 0.13 time, 1.12 times as divalent cobalt and 0.4 time, based on the number of moles of $Al_2O_3$ in the zeolite.

EXAMPLE 6: EVALUATION OF CATALYST ACTIVITY

Catalysts 1 to 5 and comparative catalysts 1 and 2 were each press-molded and then crushed to regulate the size of granules to 12 to 20 meshes, and an atmospheric fixed bed reaction tube was packed with 1 g of each of the granular catalysts. The temperature of the catalyst bed was raised to 500° C. while passing a gas having the following composition (hereinafter referred to as "reaction gas") through the reaction tube at a flow rate of 1000 ml/min, and the temperature was maintained at 500° C. for 0.5 hr, to thereby conduct a pretreatment. Thereafter, the temperature of the catalyst bed was raised from 300° to 500° C. In this case, the temperature was kept constant at each 50° C. increment, to measure the catalytic activity at respective temperatures. The $NO_x$ conversions at respective temperatures after the state had become steady are shown in Table 1. The $NO_x$ conversion can be determined by the following equation.

$$NO_x \text{ conversion (\%)} = \frac{NO_{xin} - NO_{xout}}{NO_{xin}} \times 100$$

wherein $NO_{xin}$ = $NO_x$ concentration at inlet of fixed bed reaction tube $NO_{xout}$ = $NO_x$ concentration at outlet of fixed bed reaction tube.

In all of the catalysts, little carbon monoxide was detected at 450° C. or above, and few hydrocarbons were detected at 400° C. or above.

Composition of reaction gas:

| | |
|---|---|
| NO | 700 ppm |
| $O_2$ | 4% |
| $H_2$ | 330 ppm |
| CO | 1000 ppm |
| $C_3H_6$ | 400 ppm |
| $H_2O$ | 3% |
| $CO_2$ | 10% |
| $N_2$ | balance |

TABLE 1

| Cat-alyst | Composition | | | $NO_x$ conversion (%) | | | | |
|---|---|---|---|---|---|---|---|---|
| | | | | 300° C. | 350° C. | 400° C. | 450° C. | 500° C. |
| Catalyst 1 | La | Co | Ag | 11 | 34 | 61 | 48 | 37 |
| Catalyst 2 | La | Co | Ag | 18 | 65 | 63 | 54 | 41 |
| Catalyst 3 | La | Co | Ag | 13 | 46 | 62 | 50 | 36 |
| Catalyst 4 | La | Co | Ag | 17 | 66 | 68 | 53 | 40 |
| Catalyst 5 | Ce | Co | Ag | 12 | 49 | 53 | 43 | 35 |
| Comp. Cat. 1 | La | Co | — | 6 | 31 | 49 | 39 | 28 |
| Comp. Cat. 2 | Ce | Co | — | 7 | 30 | 47 | 38 | 29 |

EXAMPLE 7: EVALUATION OF DURABILITY OF CATALYSTS

Catalyst 1 and comparative catalyst 1 were subjected to an endurance treatment at 800° C. for 5 hr while flowing the above-mentioned reaction gas therethrough, and then subjected to a measurement of the catalytic activity in the same manner as that of Example 6. The $NO_x$ conversions at respective temperatures after the state had become steady are shown in Table 2.

TABLE 2

| Cat-alyst | Composition | | | $NO_x$ conversion (%) | | | | |
|---|---|---|---|---|---|---|---|---|
| | | | | 300° C. | 350° C. | 400° C. | 450° C. | 500° C. |
| Catalyst 1 | Co | La | Ag | 9 | 27 | 45 | 50 | 40 |
| Comp. Cat. 1 | Co | La | — | 5 | 25 | 43 | 38 | 31 |

EXAMPLE 8: PREPARATION OF CATALYST 6

A 15 g amount of comparative catalyst 1 prepared in Comparative Example 1 was put in 43 ml of a 0.05 mol/liter aqueous nickel nitrate solution, dried under a reduced pressure while stirring, and further dried at 110° C. for 16, to thereby prepare a catalyst 6. The catalyst was subjected to a chemical analysis to determine the contents of lanthanum, cobalt and nickel, and as a result, it was found that lanthanum, cobalt and nickel were contained in respective amounts of 0.33 time, 1.13 times as divalent cobalt and 0.4 time, based on the number of moles of $Al_2O_3$ in the zeolite.

EXAMPLE 9: PREPARATION OF CATALYST 7

A 20 g amount of ammonium type ZSM-5 prepared in Comparative Example 1 was put in 180 ml of a 1.09 mol/liter aqueous lanthanum chloride solution, and the mixture was stirred at 80° C. for 16 hr. The stirred mixture was subjected to solid-liquid separation, washed with water, subsequently put in 180 ml of a 0.23 mol/liter aqueous cobalt (II) nitrate tetrahydrate solution, and the mixture was stirred at 80° C. for 16 hr. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 10 hr, and the procedure of Example 8 was repeated, to prepare a catalyst 7. The catalyst was subjected to a chemical analysis to determine the contents of lanthanum, cobalt and nickel, and as a result, it was found that lanthanum, cobalt and nickel were contained respectively in amounts of 0.32 time, 0.42 time as divalent cobalt and 0.4 time, based on the number of moles of $Al_2O_3$ in the zeolite.

EXAMPLE 10: PREPARATION OF CATALYST 8

A catalyst 8 was prepared in the same manner as that of Example 9, except that nickel chloride was used instead of nickel nitrate. The catalyst was subjected to a chemical analysis to determine the contents of lanthanum, cobalt and nickel, and as a result, it was found that lanthanum, cobalt and nickel were contained respectively in amounts of 0.32 time, 0.42 time as divalent cobalt and 0.4 time, based on the number of moles of $Al_2O_3$ in the zeolite.

EXAMPLE 11: PREPARATION OF CATALYST 9

A catalyst 9 was prepared in the same manner as that of Example 9, except that nickel acetate was used instead of nickel nitrate. The catalyst was subjected to a chemical analysis to determine the contents of lanthanum, cobalt and nickel, and as a result, it was found that lanthanum, cobalt and nickel were contained respectively in amounts of 0.32 time, 0.42 time as divalent cobalt and 0.4 time, based on the number of moles of $Al_2O_3$ in the zeolite.

EXAMPLE 12: PREPARATION OF CATALYST 10

A 15 g amount of comparative catalyst 2 prepared in Comparative Example 2 was put in 43 ml of a 0.05 mol/liter aqueous nickel nitrate solution, dried under reduced pressure while stirring, and further dried at 110° C. for 16, to thereby prepare a catalyst 10. The catalyst was subjected to a chemical analysis to determine the contents of cerium, cobalt and nickel, and as a result, it was found that cerium, cobalt and nickel were contained in respective amounts of 0.13 time, 1.12 times as divalent cobalt and 0.4 time, based on the number of moles of $Al_2O_3$ in the zeolite.

COMPARATIVE EXAMPLE 3: PREPARATION OF COMPARATIVE CATALYST 3

A comparative catalyst 3 was prepared in the same manner as that of Comparative Example 2, except that yttrium was used as the rare earth metal. The comparative catalyst was subjected to a chemical analysis to determine the contents of yttrium and cobalt, and as a result, it was found that yttrium and cobalt were contained in respective amounts of 0.28 time and 0.98 time, as divalent cobalt, based on the number of moles of $Al_2O_3$ in the zeolite.

EXAMPLE 13: PREPARATION OF CATALYST 11

A 15 g amount of comparative catalyst 3 prepared in Comparative Example 3 was put in 43 ml of a 0.05 mol/liter aqueous nickel nitrate solution, dried under reduced pressure while stirring, and further dried at 110° C. for 16, to thereby prepare a catalyst 11. The catalyst was subjected to chemical analysis to determine the contents of yttrium, cobalt and nickel, and as a result, it was found that yttrium, cobalt and nickel were contained in respective amounts of 0.28 time, 0.98 time as divalent cobalt and 0.4 time, based on the number of moles of $Al_2O_3$ in the zeolite.

COMPARATIVE EXAMPLE 4: PREPARATION OF COMPARATIVE CATALYST 4

A comparative catalyst 4 was prepared in the same manner as that of Comparative Example 2, except that praseodymium was used as the rare earth metal. The comparative catalyst was subjected to a chemical analysis to determine the contents of praseodymium and cobalt, and as a result, it was found that praseodymium and cobalt were contained in respective amounts of 0.14 time and 1.04 times, as divalent cobalt, based on the number of moles of $Al_2O_3$ in the zeolite.

EXAMPLE 14: PREPARATION OF CATALYST 12

A 15 g amount of comparative catalyst 4 prepared in Comparative Example 4 was put in 43 ml of a 0.05 mol/liter aqueous nickel nitrate solution, dried under reduced pressure while stirring, and further dried at 110° C. for 16, to thereby prepare a catalyst 12. The catalyst was subjected to chemical analysis to determine the contents of praseodymium, cobalt and nickel, and as a result, it was found that praseodymium, cobalt and nickel were contained in respective amounts of 0.14 time, 1.04 times as divalent cobalt and 0.4 time, based on the number of moles of $Al_2O_3$ in the zeolite.

COMPARATIVE EXAMPLE 5: PREPARATION OF COMPARATIVE CATALYST 5

A 20 g amount of ammonium type ZSM-5 prepared in Comparative Example 1 was put in 180 ml of a 0.23 mol/liter aqueous nickel acetate tetrahydrate solution, and the mixture was stirred at 80° C. for 16 hr. The stirred mixture was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 10 hr, to prepare a comparative catalyst 5. The catalyst was subjected to a chemical analysis to determine the nickel content, and as a result, it was found that nickel was contained as divalent nickel in an amount of 1.40 times, based on the number of moles of $Al_2O_3$ in the zeolite.

EXAMPLE 15: PREPARATION OF CATALYST 13

A catalyst 13 was prepared in the same manner as that of Example 8, except that zinc nitrate was used instead of nickel nitrate. The catalyst was subjected to a chemical analysis to determine the contents of lanthanum, cobalt and zinc, and as a result, it was found that lanthanum, cobalt and zinc were contained in respective amounts of 0.33 time, 1.13 times as divalent cobalt and 0.4 time, based on the number of moles of $Al_2O_3$ in the zeolite.

EXAMPLE 16: PREPARATION OF CATALYST 14

A catalyst 14 was prepared in the same manner as that of Example 9, except that zinc nitrate was used instead of nickel nitrate. The catalyst was subjected to a chemical analysis to determine the contents of lanthanum, cobalt and zinc, and as a result, it was found that lanthanum, cobalt and zinc were contained in respective amounts of 0.32 time, 0.42 times as divalent cobalt and 0.4 time, based on the number of moles of $Al_2O_3$ in the zeolite.

EXAMPLE 17: PREPARATION OF CATALYST 15

A catalyst 15 was prepared in the same manner as that of Example 12, except that zinc nitrate was used instead of nickel nitrate. The catalyst was subjected to a chemical analysis to determine the contents of cerium, cobalt and zinc, and as a result, it was found that cerium, cobalt and zinc were contained in respective amounts of 0.13 time, 1.12 times as divalent cobalt and 0.4 time, based on the number of moles of $Al_2O_3$ in the zeolite.

EXAMPLE 18: EVALUATION OF ACTIVITY OF CATALYST

Catalysts 6 to 15 and comparative catalysts 1 to 5 were subjected to a measurement of the catalytic activity in the same manner as that of Example 6. The $NO_x$ conversions at respective temperatures after the state had become steady are shown in Table 3.

In all of the catalysts, little carbon monoxide was detected at 450° C. or above, and few hydrocarbons were detected at 400° C. or above.

TABLE 3

| Catalyst | Composition | | | $NO_x$ conversion (%) | | | | |
|---|---|---|---|---|---|---|---|---|
| | | | | 300° C. | 350° C. | 400° C. | 450° C. | 500° C. |
| Catalyst 6 | Co | La | Ni | 11 | 43 | 54 | 42 | 32 |
| Catalyst 7 | Co | La | Ni | 14 | 51 | 52 | 40 | 30 |
| Catalyst 8 | Co | La | Ni | 10 | 37 | 50 | 41 | 30 |
| Catalyst 9 | Co | La | Ni | 12 | 42 | 51 | 42 | 31 |
| Catalyst 10 | Co | Ce | Ni | 13 | 49 | 51 | 41 | 30 |
| Catalyst 11 | Co | Y | Ni | 12 | 50 | 52 | 42 | 32 |
| Catalyst 12 | Co | Pr | Ni | 11 | 48 | 51 | 40 | 29 |
| Catalyst 13 | Co | La | Zn | 8 | 33 | 58 | 50 | 41 |
| Catalyst 14 | Co | La | Zn | 7 | 16 | 60 | 49 | 39 |
| Catalyst 15 | Co | Ce | Zn | 7 | 22 | 56 | 47 | 37 |
| Comp. Cat. 1 | La | Co | — | 6 | 31 | 49 | 39 | 28 |
| Comp. Cat. 2 | Ce | Co | — | 7 | 30 | 47 | 38 | 29 |
| Comp. Cat. 3 | Co | Y | — | 6 | 29 | 48 | 37 | 27 |
| Comp. Cat. 4 | Co | Pr | — | 5 | 26 | 46 | 36 | 26 |

TABLE 3-continued

| Cat- | | | NO$_x$ conversion (%) | | | | |
|---|---|---|---|---|---|---|---|
| alyst | Composition | | 300° C. | 350° C. | 400° C. | 450° C. | 500° C. |
| Comp. Cat. 5 | — | — | Ni | 10 | 31 | 36 | 32 | 28 |

EXAMPLE 19: EVALUATION OF DURABILITY OF CATALYST

Catalysts 6 to 15 and comparative catalysts 1 to 5 were subjected to a measurement of the durability in the same manner as that of Example 7. The NO$_x$ conversions at respective temperatures after the state had become steady are shown in Table 4.

TABLE 4

| Cat- | | | | NO$_x$ conversion (%) | | | | |
|---|---|---|---|---|---|---|---|---|
| alyst | Composition | | | 300° C. | 350° C. | 400° C. | 450° C. | 500° C. |
| Catalyst 6 | Co | La | Ni | 9 | 32 | 53 | 58 | 50 |
| Catalyst 7 | Co | La | Ni | 8 | 24 | 50 | 56 | 47 |
| Catalyst 8 | Co | La | Ni | 6 | 23 | 48 | 59 | 49 |
| Catalyst 9 | Co | La | Ni | 6 | 22 | 45 | 48 | 41 |
| Catalyst 10 | Co | Ce | Ni | 7 | 24 | 50 | 54 | 43 |
| Catalyst 11 | Co | Y | Ni | 7 | 21 | 47 | 50 | 41 |
| Catalyst 12 | Co | Pr | Ni | 6 | 21 | 48 | 53 | 42 |
| Catalyst 13 | Co | La | Zn | 7 | 24 | 45 | 44 | 38 |
| Catalyst 14 | Co | La | Zn | 6 | 20 | 40 | 42 | 38 |
| Catalyst 15 | Co | Ce | Zn | 6 | 19 | 41 | 43 | 39 |
| Comp. Cat. 1 | La | Co | — | 6 | 31 | 49 | 39 | 28 |
| Comp. Cat. 2 | Ce | Co | — | 7 | 30 | 47 | 38 | 29 |
| Comp. Cat. 3 | Co | Y | — | 5 | 23 | 40 | 36 | 29 |
| Comp. Cat. 4 | Co | Pr | — | 4 | 22 | 39 | 35 | 27 |
| Comp. Cat. 5 | — | — | Ni | 2 | 7 | 21 | 32 | 28 |

EXAMPLE 20: PREPARATION OF CATALYST 16

A 15 g amount of comparative catalyst 1 prepared in Comparative Example 1 was put in 43 ml of a 0.05 mol/liter aqueous tetraaminedichloroplatinum solution, dried under a reduced pressure while stirring, and further dried at 110° C. for 16 hr, to thereby prepare a catalyst 16. The catalyst was subjected to a chemical analysis to determine the contents of lanthanum, cobalt and platinum, and as a result, it was found that lanthanum, cobalt and platinum were contained in respective amounts of 0.33 time, 1.13 times as divalent cobalt and 0.4 time, based on the number of moles of Al$_2$O$_3$ in the zeolite.

EXAMPLE 21: PREPARATION OF CATALYST 17

A 15 g amount of comparative catalyst 1 prepared in Comparative Example 1 was put in 22 ml of a 0.025 mol/liter aqueous tetraaminedichloroplatinum solution, dried under a reduced pressure while stirring, and further dried at 110° C. for 16 hr, to thereby prepare a catalyst 17. The catalyst was subjected to a chemical analysis to determine the contents of lanthanum, cobalt and platinum, and as a result, it was found that lanthanum, cobalt and platinum were contained in respective amounts of 0.33 time, 1.13 times as divalent cobalt and 0.1 time, based on the number of moles of Al$_2$O$_3$ in the zeolite.

EXAMPLE 22: PREPARATION OF CATALYST 18

A 200 g amount of ammonium type ZSM-5 prepared in Comparative Example 1 was put in 1800 ml of a 1.09 mol/liter aqueous lanthanum chloride solution, and the mixture was stirred at 80° C. for 16 hr. The stirred mixture was subjected to solid-liquid separation, washed with water, subsequently put in 1800 ml of a 0.23 mol/liter cobalt (II) nitrate tetrahydrate solution, and the mixture was stirred at 80° C. for 16 hr. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 20 hr, to prepare ZSM-5 containing cobalt and lanthanum. 15 g of the ZSM-5 containing cobalt and lanthanum was put in 43 ml of a 0.05 mol/liter aqueous tetraaminedichloroplatinum solution, dried under a reduced pressure while stirring, and further dried at 110° C. for 16 hr, to thereby prepare a catalyst 18. The catalyst was subjected to a chemical analysis to determine the contents of lanthanum, cobalt and platinum, and as a result, it was found that lanthanum, cobalt and platinum were contained in respective amounts of 0.32 time, 0.42 time as divalent cobalt and 0.4 time, based on the number of moles of Al$_2$O$_3$ in the zeolite.

EXAMPLE 23: PREPARATION OF CATALYST 19

A 15 g amount of the ZSM-5 containing cobalt and lanthanum prepared in Example 22 was put in 43 ml of a 0.05 mol/liter aqueous manganese acetate solution, dried under a reduced pressure while stirring, and further dried at 110° C. for 16 hr, to thereby prepare a catalyst 19. The catalyst was subjected to a chemical analysis to determine the contents of lanthanum, cobalt and manganese, and as a result, it was found that lanthanum, cobalt and manganese were contained in respective amounts of 0.32 time, 0.42 time as divalent cobalt and 0.4 time, based on the number of moles of Al$_2$O$_3$ in the zeolite.

EXAMPLE 24: PREPARATION OF CATALYST 20

A catalyst 20 was prepared in the same manner as that of Example 23, except that manganese nitrate was used instead of manganese acetate. The catalyst was subjected to a chemical analysis to determine the contents of lanthanum, cobalt and manganese, and as a result, it was found that lanthanum, cobalt and manganese were contained in respective amounts of 0.32 time, 0.42 time as divalent cobalt and 0.4 time, based on the number of moles of $Al_2O_3$ in the zeolite.

EXAMPLE 25: PREPARATION OF CATALYST 21

A catalyst 21 was prepared in the same manner as that of Example 23, except that manganese chloride was used instead of manganese acetate. The catalyst was subjected to a chemical analysis to determine the contents of lanthanum, cobalt and manganese, and as a result, it was found that lanthanum, cobalt and manganese were contained in respective amounts of 0.32 time, 0.42 time as divalent cobalt and 0.4 time, based on the number of moles of $Al_2O_3$ in the zeolite.

EXAMPLE 26: PREPARATION OF CATALYST 22

A 15 g amount of comparative catalyst 2 prepared in Comparative Example 2 was put in 43 ml of a 0.05 mol/liter aqueous tetraaminedichloroplatinum solution, dried under a reduced pressure while stirring, and further dried at 110° C. for 16 hr, to thereby prepare a catalyst 22. The catalyst was subjected to a chemical analysis to determine the contents of cerium, cobalt and platinum, and as a result, it was found that cerium, cobalt and platinum were contained in respective amounts of 0.13 time, 1.12 times as divalent cobalt and 0.4 time, based on the number of moles of $Al_2O_3$ in the zeolite.

EXAMPLE 27: PREPARATION OF CATALYST 23

A catalyst 23 was prepared in the same manner as that of Example 26, except that manganese nitrate was used instead of tetraaminedichloroplatinum. The catalyst was subjected to a chemical analysis to determine the contents of cerium, cobalt and manganese, and as a result, it was found that cerium, cobalt and manganese were contained in respective amounts of 0.13 time, 1.12 times as divalent cobalt and 0.4 time, based on the number of moles of $Al_2O_3$ in the zeolite.

EXAMPLE 28: EVALUATION OF ACTIVITY OF CATALYSTS

Catalysts 16 to 22 were pretreated in the same manner as that of Example 6, and the temperature of the catalyst bed was raised from 250° to 450° C. In this case, the temperature was kept constant at each 50° C. increment to measure the catalytic activity at respective temperatures. The $NO_x$ conversions at respective temperatures after the state had become steady are shown in Table 5.

TABLE 5

| Cat-alyst | Composition | | | $NO_x$ conversion (%) | | | | |
|---|---|---|---|---|---|---|---|---|
| | | | | 250° C. | 300° C. | 350° C. | 400° C. | 450° C. |
| Catalyst 16 | Co | La | Pt | 41 | 34 | 30 | 19 | 10 |
| Catalyst 17 | Co | La | Pt | 38 | 23 | 19 | 14 | 9 |
| Catalyst 18 | Co | La | Pt | 36 | 28 | 23 | 14 | 9 |
| Catalyst 19 | Co | La | Mn | 18 | 40 | 51 | 44 | 34 |
| Catalyst 20 | Co | La | Mn | 18 | 33 | 52 | 40 | 32 |
| Catalyst 21 | Co | La | Mn | 15 | 25 | 48 | 45 | 35 |
| Catalyst 22 | Co | Ce | Pt | 40 | 34 | 29 | 18 | 10 |
| Catalyst 23 | Co | Ce | Mn | 18 | 35 | 52 | 43 | 35 |
| Comp. Cat. 1 | La | Co | — | 6 | 31 | 49 | 39 | 28 |
| Comp. Cat. 2 | Ce | Co | — | 7 | 30 | 47 | 38 | 29 |

In the comparative catalysts, little carbon monoxide was detected at 450° C. or above, and few hydrocarbons were detected at 400° C. or above. On the other hand, in the catalysts of examples of the present invention, little carbon monoxide was detected at 400° C. or above, and few hydrocarbons were detected at 350° C. or above.

EXAMPLE 29: EVALUATION OF DURABILITY OF CATALYSTS

Catalysts 16 to 22 were pretreated in the same manner as that of Example 7, and the catalytic activity was measured in the same manner as that of Example 28. The $NO_x$ conversions at respective temperatures after the state had become steady are shown in Table 6.

TABLE 6

| Cat-alyst | Composition | | | $NO_x$ conversion (%) | | | | |
|---|---|---|---|---|---|---|---|---|
| | | | | 250° C. | 300° C. | 350° C. | 400° C. | 450° C. |
| Catalyst 16 | Co | La | Pt | 37 | 36 | 27 | 17 | 9 |
| Catalyst 17 | Co | La | Pt | 24 | 29 | 21 | 13 | 8 |
| Catalyst 18 | Co | La | Pt | 43 | 36 | 25 | 17 | 10 |
| Catalyst 19 | Co | La | Mn | 10 | 12 | 34 | 41 | 38 |
| Catalyst 20 | Co | La | Mn | 10 | 13 | 33 | 40 | 39 |
| Catalyst 21 | Co | La | Mn | 10 | 16 | 35 | 41 | 40 |
| Catalyst 22 | Co | Ce | Pt | 37 | 33 | 28 | 16 | 10 |
| Catalyst 23 | Co | Ce | Mn | 10 | 14 | 34 | 40 | 38 |
| Comp. Cat. 1 | La | Co | — | 6 | 31 | 45 | 39 | 28 |
| Comp. Cat. 2 | Ce | Co | — | 7 | 30 | 47 | 38 | 29 |

EXAMPLE 30: PREPARATION OF CATALYST 24

A 200 g amount of ammonium type ZSM-5 prepared in Comparative Example 1 was put in 1800 ml of a 1.09 mol/liter aqueous lanthanum chloride solution, and the mixture was stirred at 80° C. for 16 hr. The stirred mixture was subjected to solid-liquid separation, washed with water, subsequently put in 1800 ml of a 0.23 mol/liter cobalt (II) nitrate tetrahydrate solution, and the mixture was stirred at 80° C. for 16 hr. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 20 hr, to prepare ZSM-5 containing cobalt and lanthanum. Then, 15 g of the ZSM-5 containing cobalt and lanthanum was put in 43 ml of a 0.05 mol/liter aqueous copper acetate solution, dried under a reduced pressure while stirring, and further dried at 110° C. for 16 hr, to thereby prepare a catalyst 24. The catalyst was subjected to a chemical analysis to determine the contents of lanthanum, cobalt and copper, and as a result, it was found that lanthanum, cobalt and copper were contained in respective amounts of 0.32 time, 0.42 time as divalent cobalt and 0.4 time, based on the number of moles of $Al_2O_3$ in the zeolite.

EXAMPLE 31: PREPARATION OF CATALYST 25

A catalyst 25 was prepared in the same manner as that of Example 30, except that rhodium nitrate was used instead of copper acetate. The catalyst was subjected to a chemical analysis to determine the contents of lanthanum, cobalt and rhodium, and as a result, it was found that lanthanum, cobalt and rhodium were contained in respective amounts of 0.32 time, 0.42 time as divalent cobalt and 0.4 time, based on the number of moles of $Al_2O_3$ in the zeolite.

EXAMPLE 32: PREPARATION OF CATALYST 26

A 15 g amount of comparative catalyst 2 prepared in Comparative Example 2 was put in 43 ml of a 0.05 mol/liter aqueous copper nitrate solution, dried under a reduced pressure while stirring, and further dried at 110° C. for 16 hr, to thereby prepare a catalyst 26. The catalyst was subjected to a chemical analysis to determine the contents of cerium, cobalt and copper, and as a result, it was found that cerium, cobalt and copper were contained in respective amounts of 0.13 time, 1.12 times as divalent cobalt and 0.4 time, based on the number of moles of $Al_2O_3$ in the zeolite.

EXAMPLE 33: PREPARATION OF CATALYST 27

A catalyst 27 was prepared in the same manner as that of Example 32, except that rhodium nitrate was used instead of copper nitrate. The catalyst was subjected to a chemical analysis to determine the contents of cerium, cobalt and rhodium, and as a result, it was found that cerium, cobalt and rhodium were contained in respective amounts of 0.13 time, 1.12 time as divalent cobalt and 0.4 time, based on the number of moles of $Al_2O_3$ in the zeolite.

EXAMPLE 34: EVALUATION OF ACTIVITY OF CATALYSTS

The catalytic activities of catalysts 24 to 27 were measured in the same manner as that of Example 28. The $NO_x$ conversions at respective temperatures after the state had become steady are shown in Table 7.

In all of the catalysts, little carbon monoxide was detected at 450° C. or above, and few hydrocarbons were detected at 400° C. or above.

TABLE 7

| Catalyst | Composition | | | $NO_x$ conversion (%) | | | | |
|---|---|---|---|---|---|---|---|---|
| | | | | 250° C. | 300° C. | 350° C. | 400° C. | 450° C. |
| Catalyst 24 | Co | La | Cu | 25 | 35 | 48 | 36 | 28 |
| Catalyst 25 | Co | La | Rh | 20 | 25 | 20 | 19 | 15 |
| Catalyst 26 | Co | Ce | Cu | 26 | 35 | 46 | 37 | 30 |
| Catalyst 27 | Co | Ce | Rh | 20 | 23 | 20 | 18 | 16 |
| Comp. Cat. 1 | La | Co | — | 6 | 31 | 49 | 39 | 28 |
| Comp. Cat. 2 | Ce | Co | — | 7 | 30 | 47 | 38 | 29 |

As apparent from Tables 1 to 7, the catalysts of the present invention are superior to the comparative catalysts in the capability thereof of purifying an exhaust gas containing an excessive amount of oxygen, in particular, the capability of removing nitrogen oxides.

Specifically, 1) the addition of silver to cobalt and a rare earth metal contributes to an improvement in the capability of removing nitrogen oxides, 2) the addition of nickel and/or zinc to cobalt and a rare earth metal contributes to an improvement in the capability of removing nitrogen oxides at a high temperature of 350° C. or above, 3) the addition of platinum and/or manganese to cobalt and an alkaline earth metal contributes to an improvement in the capability of removing nitrogen oxides at a low temperature of 350° C. or below, and 4) the addition of copper and/or rhodium to cobalt and a rare earth metal contributes to a slight improvement in the capability of removing nitrogen oxides at a low temperature.

Therefore, nitrogen oxides, carbon monoxide and hydrocarbons can be removed with a high conversion by bringing the catalyst of the present invention into contact with an exhaust gas, even when the exhaust gas contains an excessive amount of oxygen.

We claim:

1. A catalyst for purifying an exhaust gas to remove nitrogen oxides, carbon monoxide and hydrocarbons from an oxygen-rich exhaust gas containing nitrogen oxides, carbon monoxide and hydrocarbons comprising (i) a zeolite having an $SiO_2/Al_2O_3$ mole ratio of at least 15 and (ii) (a) cobalt, (b) a rare earth metal and (c) silver, incorporated therein.

2. A catalyst for purifying an exhaust gas as claimed in claim 1, wherein said zeolite has the composition:

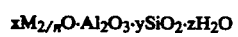

$$xM_{2/n}O \cdot Al_2O_3 \cdot ySiO_2 \cdot zH_2O$$

wherein n is a valency of the cation, x is 0.8 to 2, y is at least 2, and z is at least 0.

3. A catalyst for purifying an exhaust gas as claimed in claim 1, wherein the contents of the cobalt and the rare earth metal are 0.1 to 1.5 times and 0.1 to 1 time, respectively, in terms of a mole ratio to the alumina in the zeolite.

4. A catalyst for purifying an exhaust gas as claimed in claim 1, wherein the content of silver is 0.05 to 2 times and the total content of cobalt, rare earth metal and silver is 1.0 to 2.5 times, in terms of a mole ratio to the alumina in the zeolite.

5. A catalyst for purifying an exhaust gas to remove nitrogen oxides, carbon monoxide and hydrocarbons from an oxygen-rich exhaust gas containing nitrogen oxides, carbon monoxide and hydrocarbons, comprising (i) a zeolite having an $SiO_2/Al_2O_3$ mole ratio of at least 15 and (ii) (a) cobalt and (b) a rare earth metal and (c) at least one metal selected from the group consisting of nickel and zinc, incorporated therein.

6. A catalyst for purifying an exhaust gas as claimed in claim 5, wherein said zeolite has the composition:

$$xM_{2/n}O \cdot Al_2O_3 \cdot ySiO_2 \cdot zH_2O$$

wherein n is a valency of the cation, x is 0.8 to 2, y is at least 2, and z is at least 0.

7. A catalyst for purifying an exhaust gas as claimed in claim 5, wherein the contents of the cobalt and the rare earth metal are 0.1 to 1.5 times and 0.1 to 1 time, respectively, in terms of a mole ratio to the alumina in the zeolite.

8. A catalyst for purifying an exhaust gas as claimed in claim 5, wherein the content of nickel or zinc is 0.05 to 2 times and the total content of cobalt and rare earth metal and nickel and/or zinc is 1.0 to 2.5 times, in terms of a mole ratio to the alumina in the zeolite.

9. A catalyst for purifying an exhaust gas to remove nitrogen oxides, carbon monoxide and hydrocarbons from an oxygen-rich exhaust gas containing nitrogen oxides, carbon monoxide and hydrocarbons comprising (i) a zeolite having an $SiO_2/Al_2O_3$ mole ratio of at least 15 and (ii) (a) cobalt and (b) a rare earth metal and (c) at least one metal selected from the group consisting of platinum and manganese, incorporated therein.

10. A catalyst for purifying an exhaust gas as claimed in claim 9, wherein said zeolite has the composition:

$$xM_{2/n}O \cdot Al_2O_3 \cdot ySiO_2 \cdot zH_2O$$

wherein n is a valency of the cation, x is 0.8 to 2, y is at least 2, and z is at least 0.

11. A catalyst for purifying an exhaust gas as claimed in claim 9, wherein the contents of the cobalt and the rare earth metal are 0.1 to 1.5 times and 0.1 to 1 time, respectively, in terms of a mole ratio to the alumina in the zeolite.

12. A catalyst for purifying an exhaust gas as claimed in claim 9, wherein the content of platinum or manganese is 0.05 to 1.5 times and the total content of cobalt and rare earth metal and platinum and/or manganese is 1.0 to 2.5 times, in terms of a mole ratio to the alumina in the zeolite.

13. A catalyst for purifying an exhaust gas to remove nitrogen oxides, carbon monoxide and hydrocarbons from an oxygen-rich exhaust gas containing nitrogen oxides, carbon monoxide and hydrocarbons comprising (i) a zeolite having an $SiO_2/Al_2O_3$ mole ratio of at least 15 and (ii) (a) cobalt and (b) a rare earth metal and (c) at least one metal selected from the group consisting of copper and rhodium, incorporated therein.

14. A catalyst for purifying an exhaust gas as claimed in claim 13, wherein said zeolite has the composition:

$$xM_{2/n}O \cdot Al_2O_3 \cdot ySiO_2 \cdot zH_2O$$

wherein n is a valency of the cation, x is 0.8 to 2, y is at least 2, and z is at least 0.

15. A catalyst for purifying an exhaust gas as claimed in claim 13, wherein the contents of the cobalt and the rare earth metal are 0.1 to 1.5 times and 0.1 to 1 time, respectively, in terms of a mole ratio to the alumina in the zeolite.

16. A Catalyst for purifying an exhaust gas as claimed in claim 13, wherein the content of copper or rhodium is 0.05 to 1.5 times and the total content of cobalt and rare earth metal and copper and/or rhodium is 1.0 to 2.5 times, in terms of a mole ratio to the alumina in the zeolite.

* * * * *